Dec. 19, 1950     O. T. TOPPER     2,534,539
STROLLER
Filed Oct. 15, 1945     3 Sheets-Sheet 2
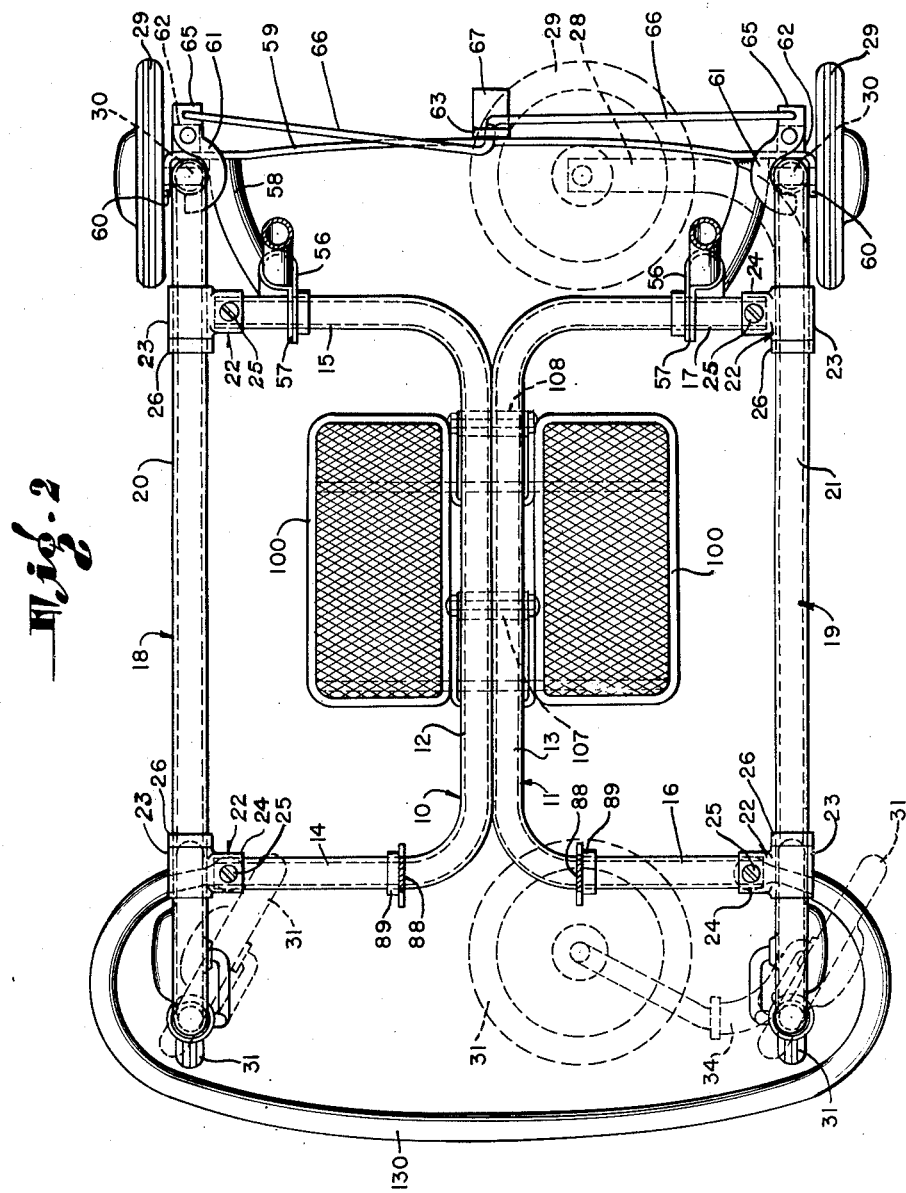
Fig. 2
INVENTOR.
OSCAR T. TOPPER
ATTORNEY Dec. 19, 1950 — O. T. TOPPER — 2,534,539
STROLLER
Filed Oct. 15, 1945 — 3 Sheets-Sheet 3
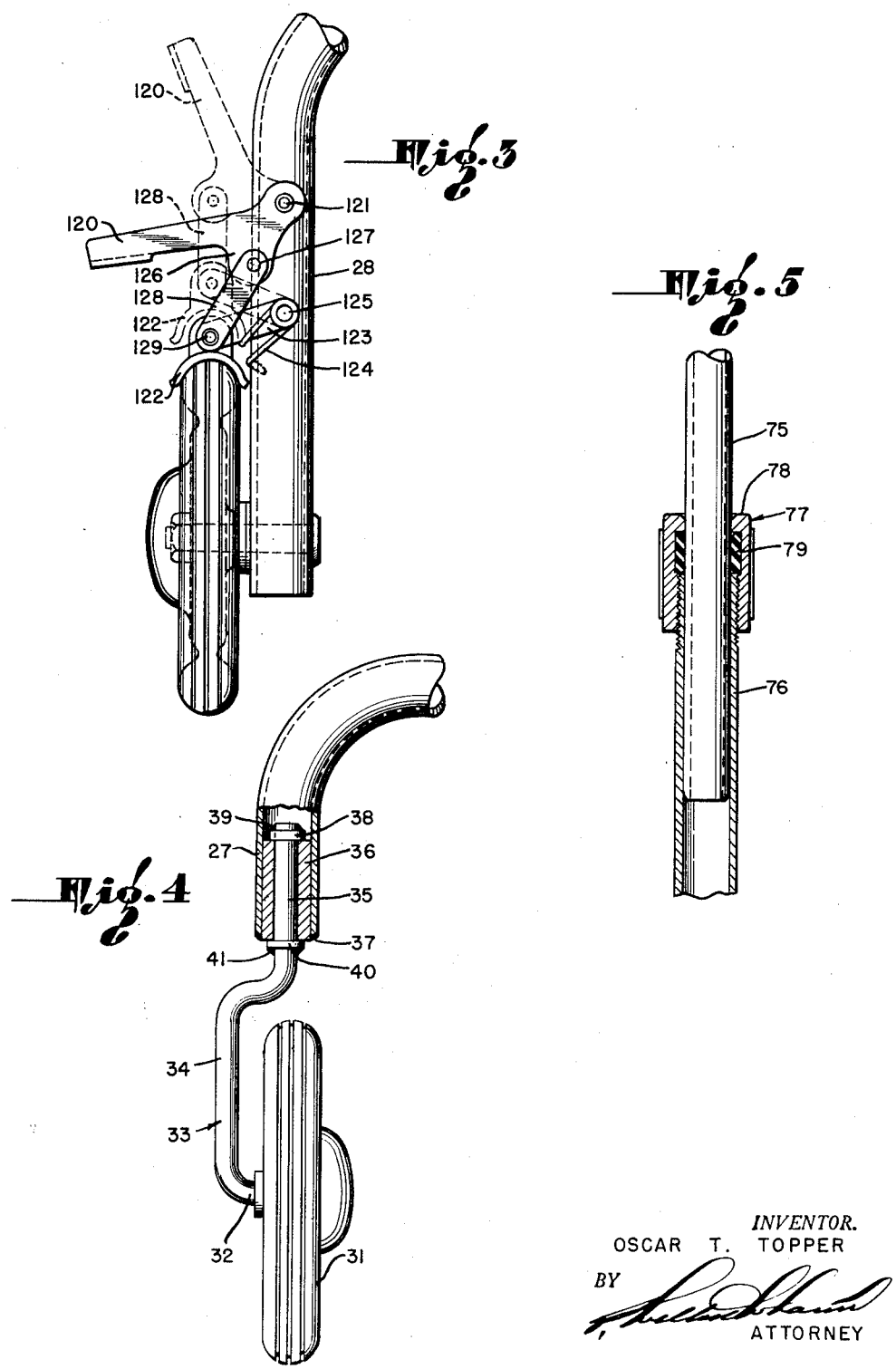
INVENTOR.
OSCAR T. TOPPER
BY 
ATTORNEY Patented Dec. 19, 1950

2,534,539

UNITED STATES PATENT OFFICE 2,534,539

STROLLER

Oscar T. Topper, Santa Monica, Calif.

Application October 15, 1945, Serial No. 622,367

7 Claims. (Cl. 155—22)

This invention relates generally to vehicles, and more particularly to folding or collapsible vehicles for small children and babies.

In vehicles of this character it is desirable to provide a device that is simple to manufacture, simple and sturdy in construction, easy to fold and unfold, and attractive in appearance; and it is an object of the present invention to provide a device having the foregoing characteristics.

Another object of the invention is to provide a device of this character, wherein the frame comprises five generally U-shaped members, two of them being disposed horizontally and forming the main chassis or frame, two more of them being reaches for the wheels, and the fifth forming the handle pivoted on said main frame members and adapted to be latched to the second two, to hold all the members rigidly in position.

It is another object to provide a device of this character wherein the U-shaped main frame or chassis members are disposed back-to-back, giving central support to the seat and the foot rest, thereby allowing the child to straddle the main frame without the use of an auxiliary frame, the outwardly extending arms of the U-shaped members pivotally joining the wheel reaches.

Still another object of the invention is to provide a device of this character, wherein a back support is attached to the handle and is foldable therewith.

It is another object of the invention to provide a device of this character, having novel means for pivoting the wheel reaches to the main chain or chassis U-members.

Another object of the invention is to provide a device of this character having pivoted front wheels for easy steering and novel means for pivotally attaching the front wheels to the wheel reaches. The pivoting of the front wheels is made possible in the present invention by disposing the horizontal portions of the wheel reaches in substantially the same plane as that of the main frame or chassis.

A further object of the invention is to provide a device of this character wherein, when the device is unfolded, the handle may be releasably locked to the wheel reaches, thereby locking both the vehicle frame and the folding wheels in a single action.

A still further object of the invention is to provide a device of this character, wherein there is an arm rest and tray support, and wherein the handle and tray supporting frame structure are so constructed and arranged as to be releasably locked in the folded position.

Still another object of the invention is to provide a device of this character having a foot rest which may be folded to a position where it is out of the way of the child's legs should it be desired to permit the child to propel the vehicle by means of its feet. The foot rest may also be moved to the folded position when the device is folded up.

Further advantageous features of the invention reside in the provision of yielding means for supporting the seat and in a telescoping handle, said handle being adjustable for length to suit the requirements of the individual operating the device, and may be telescoped when the device is folded to thereby reduce the overall length of the device in the folded condition.

Further objects and advantages of the invention will be brought out in the following part of the specification.

Referring to the drawings which are for illustrative purposes only,

Fig. 2 is a plan view of the chassis or main frame taken on line 2—2 of Fig. 1;

Fig. 3 is an enlarged detail view of the brake mechanism;

Fig. 4 is an enlarged view, partially in section, showing the front wheel support, and Fig. 5 is an enlarged partial section of one side of the telescoping handle taken on line 5—5 of Fig. 1.

Figure 1:
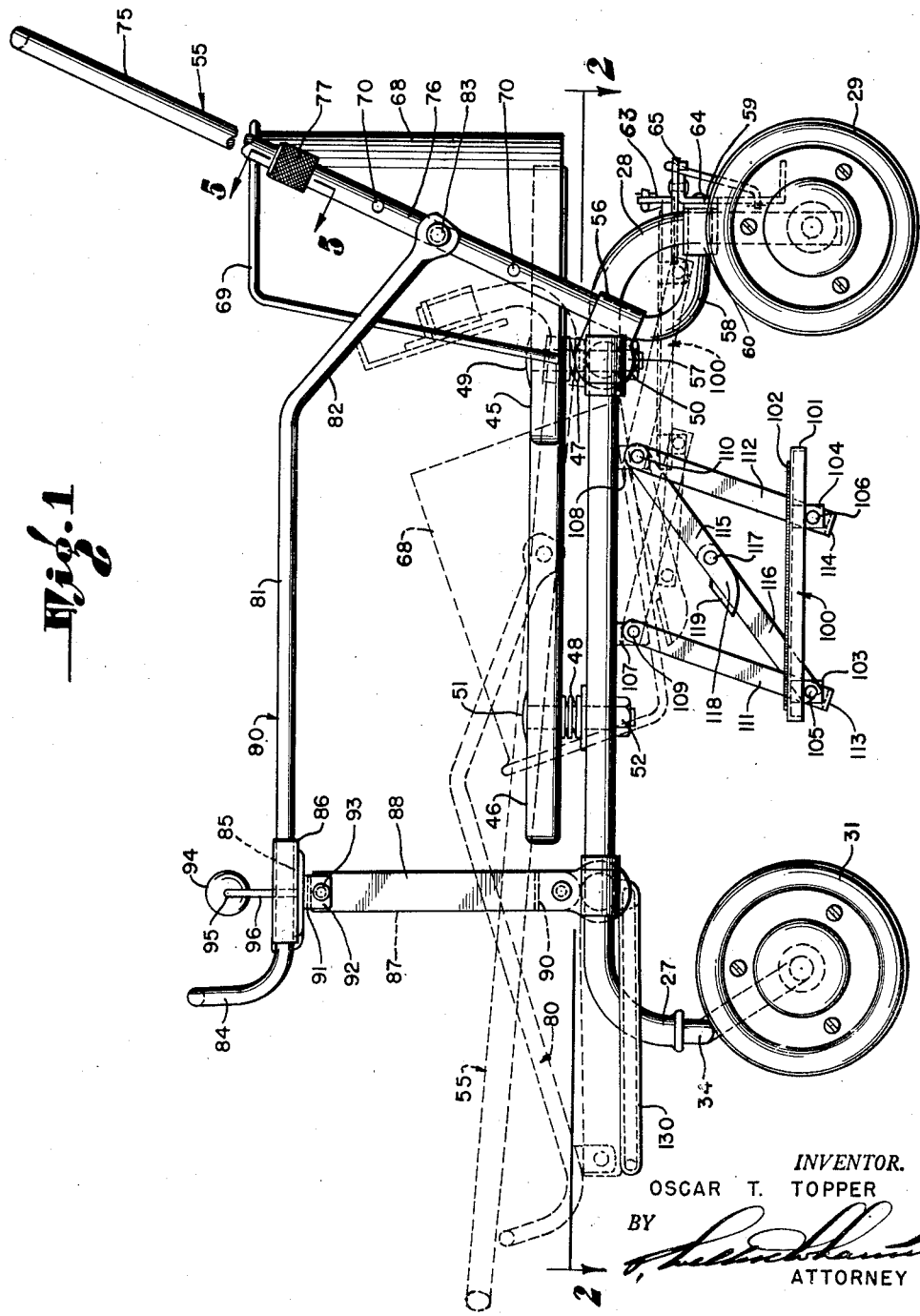
Fig. 1 is a side elevation of the vehicle in the open position, and embodying the present invention. Various parts of the device are shown by dotted lines in the folded position.

Referring now to Figs. 1 and 2, there is shown a main frame of the chassis comprising a pair of generally U-shaped members 10 and 11 which may be of any suitable material but which is shown as being formed of metal tubes in the interest of lightness and strength. The closed sides or backs 12 and 13 of the U-shaped members 10 and 11 are secured together by any suitable means such as welding, although other means may be employed to secure the parts together. The main frame is disposed substantially horizontally and the arms 14 and 15 of the member 10, and the arms 16 and 17 of the member 11 extend laterally outwardly of the joined backs. A pair of substantially U-shaped wheel reach members, indicated generally at 18 and 19 respectively, include substantially horizontally disposed portions 20 and 21 which are pivotally secured to the adjacent ends of the members 10 and 11. The means for pivotally connecting the reaches to the main frame are shown as brackets 22 having tubular portions 23 in which the horizontal portions of the reaches are rotatably received. Each bracket has a lateral extension 24 in which is received the adjacent end of the respective U-shaped frame members. Any suitable means for attaching the extensions 24 to the frame members may be employed, but as shown, this means comprises bolts 25. The brackets 22 may be formed in any suitable manner but as shown they are stamped from sheet metal and formed as shown in the drawings. Means for preventing longitudinal movement of the reaches in their brackets comprises collars 26, which are secured to the portions 20 and 21 of the respective wheel reaches and are disposed adjacent facing ends of the portions 23 of said brackets. Each of the wheel reach members includes end portions 27, 28, which extend downwardly when the vehicle is in the operative position, the portions 27 being at the front end of the vehicle, and the portions 28 being at the back end thereof.

A wheel is provided for each end of each wheel reach. The rear wheels 29 are mounted on respective axles 30 which extend through openings provided therefor in the respective ends 28 and secured therein by welding or any other suitable means. The front wheels 31 are attached to the respective ends 27 of the wheel reaches and each front wheel is mounted on a laterally turned end 32 of a wheel supporting member indicated generally at 33, said wheel supporting member 33 having an offset portion 34 which permits the wheel 31 to be disposed in substantial alignment with a pivotal portion 35 of the member 33 which is rotatable in a bearing 36 in the end 27, the wheel 31 being adapted to pivot on the axis of the portion 35. The bearing 36 may be secured in the end 27 by any suitable means, but as shown, said bearing is welded at 37 to the end 27. A washer or collar 38 is welded at 39 to the end of portion 35 adjacent the upper end of the bearing 36, and a second washer 40 is welded at 41 to the portion 35 adjacent the lower end of the bearing 36. With this arrangement the front wheel supports are securely attached to the respective ends 27 of the wheel reaches and will easily pivot with respect to said reaches. It is to be noted that the axes of the front wheels are offset with respect to the axes of the portions 35 so that the front wheels may be easily turned for steering. It is to be noted that pivoting of the front wheels is made possible by the fact that the horizontal portions of the wheel reaches are in substantially the same plane as that of the main frame members 10 and 11.

A seat 45 is provided and is located over the lateral portions 15 and 17 of the main frame, and said seat includes a forwardly extending part 46 which is normally substantially parallel to the backs 12 and 13 of said main frame. The seat is supported on springs 47 and 48. There is a spring 47 adjacent each side of the seat 45, and each spring is disposed about a bolt 49 which passes through the seat and through the adjacent laterally turned portion of the frame members 10 and 11. A nut 50 is threaded onto each bolt 49, adjacent the end thereof, for limiting upward movement of the seat, and if desired, the threads of the bolt which extend beyond the nut, may be mutilated to prevent the nut from accidentally unscrewing from the bolt. A similar arrangement is provided for connecting the free end of the part 46 of the seat, a bolt 51 being received through an opening provided therefor in said extension, and said bolt extends through the coil spring 48 and through an opening provided therefor in the joined backs 12, 13, of the main frame members 10 and 11. A nut 52 is provided on said bolt 51 for securing the parts together, and the threads of the bolt which extend beyond the nut may be also mutilated, as in the case of the bolts 49. With the foregoing seat and frame arrangement, the child can straddle the extension 46 and main frame parts 12, 13, which are centrally disposed relative to the length of the vehicle, and if the child wishes to propel the device with his feet it may easily do so.

Means for pushing the vehicle is provided, and as shown comprises a fifth substantially U-shaped member, indicated generally at 55, which member, if desired, may be of tubular stock. The handle 55 inclines upwardly and rearwardly when the vehicle is unfolded and in a position to be used, and each arm of said handle is pivotally attached to the respective frame portions 15 and 17. As shown, the attaching means comprises metal straps 56 having parts, intermediate the ends thereof, turned about the respective arms of the handle, welded or otherwise secured thereto, and having the free ends 57 secured together, as by welding or the like. The free ends 57 are perforated for reception of the portions 15 and 17 respectively. Below the level of the plane of the main frame the respective arms of the handle have extensions 58 which, when the handle is in the upright position, curve rearwardly and somewhat outwardly to positions adjacent the downturned end portions 28 of the wheel reaches. The ends of extensions 58 are secured together by a cross member 59 which is attached to said ends by welding or the like. Each end of the cross member 59 is turned forwardly at 60, to be disposed adjacent the outer sides of the ends 28.

Means for latching together portions 28 and the handle extensions 58 is provided, and as shown comprises a hook 61 disposed horizontally and pivoted to brackets 62 welded to the cross member 59. A lever 63 is pivoted at 64 (Fig. 1), to the cross member 59 intermediate the ends thereof, and extensions 65 of the hooks are connected to the lever 63 by rods 66, said rods being attached to the lever 63 on opposite sides of the axis of said lever. If desired, the lever 63 may be provided with a rearward extension 67 whereby said lever may be more easily engaged for actuation. Movement of the lever in one direction will cause the hooks 61 to engage the downward extensions 28 and lock the handle and wheel reaches securely together in the unfolded position; and actuation of the lever 63 in the opposite direction will effect release of the extensions 28 to permit the device to be folded.

A back support 68 may be provided for the device, and as shown is formed of sheet metal having the edges 69 turned upon themselves to form a smooth bead which will prevent the occupant of the vehicle from being cut by raw edges. The back 68 is secured to the handle between the arms thereof, and may be attached by any suitable means. As shown, bolts 70 are used, although the back support may be welded to the handle. With this arrangement the back will fold with the handle when the latter is moved into overlying position with respect to the main frame.

If desired, the handle may telescope so that it may be extended or telescoped to accommodate the person pushing the vehicle. Various means may be used to lock the handle in adjusted positions. In the present invention, the handle comprises an upper U-shaped portion 75, the arms of which are telescopically received in respective handle portions 76, as shown in Fig. 5. The end of each portion 76 is threaded and receives a nut 77 thereon, which has an opening in the head 78 which receives the respective arm of the U-shaped portion 75. A gasket 79 is disposed within the nut 77 and about the respective arm of the part 75, said gasket being adapted to be compressed between the head 78 of the nut and the adjacent end of the member 76, whereby said gasket will engage and frictionally retain the parts of the handle in adjusted positions.

If desired, arm rests may be provided which may also serve as tray support. As shown in Fig. 1, the arm support comprises a substantially U-shaped frame indicated generally at 80, and includes a pair of substantially horizontal members 81 having end portions 82 inclined downwardly and rearwardly, and pivotally secured to the handle arms at 83, the forward end of the member 80 being up-turned at 84. A tray 85, of sheet metal or the like, is disclosed adjacent the forward end of the frame 80 and has the sides thereof turned about the respective portions 81, as shown at 86. The front end of the arm rest and tray support is supported by a bracket indicated generally at 87 and comprises a pair of side members 88 which have their ends pivotally mounted at 89 to the respective members 14 and 16 of the main frame, there being a cross brace 90 between the members 88. A bracket 91 is secured to the under side of the tray by any suitable means such as rivets or bolts or the like, not shown. The bracket 91 has spaced down-turned ears 92 to which the respective upward ends of the members 88 are pivoted at 93. If desired, a toy may be attached to the tray, said toy being shown as a plurality of beads 94, supported on a rod 95 having down-turned ends 96 secured to the tray.

Means may be provided whereby the child occupying the vehicle may rest its feet. This means is shown as a folding foot rest having a pair of members 100, which may be stamped from sheet metal or the like, and each provided with a down-turned marginal flange 101, for strengthening the rests. The upper surface of each of the rests 100 may be provided with a roughened pad 102 which may be of any suitable material such as rubber or the like. The plates 100 are laterally spaced apart and each plate is provided with front and rear brackets 103 and 104 respectively, which have down-turned ears with perforations therein, receiving rods 105 and 106 respectively. The rods are secured against longitudinal movement by any suitable means such as cotter pins, not shown, adjacent the outer sides of the outer ears of said brackets. A pair of brackets, 107 and 108 are secured to the back portions 12 and 13 of the main frame in longitudinally spaced relation relative to said members 12 and 13. Brackets 107 and 108 have down-turned ears in which bolts 109 and 110 are secured, and the plates 100 are pivotally suspended from said bolts 109 and 110 by links 111 and 112 respectively, said links being formed of strap or sheet metal and being united at their lower ends 113 and 114. The parts 113 and 114 serve to space the respective links apart and to also space the plates 100 apart, the lower end of links 111 and 112 being pivoted on the respective rods 105 and 106. With this supporting arrangement for the plates 100, said plates are maintained substantially parallel to the plane of the main frame and may be swung from the depending position shown in solid lines in Fig. 1 to the dotted line shown in said figure.

Means for locking or latching the foot rest in the proper depending position may be provided, and as shown comprises a pair of toggles in spaced relation to each other between the respective links 111 and 112. Each toggle comprises a lever 115 and a lever 116, the former being pivoted to bolt 110, and the latter being pivoted to the rod 105. The opposite end of lever 116 is pivoted to lever 115 at 117. The lever 115 has an extension 118 with a lateral flange 119 which is adapted to engage the adjacent portion of lever 116 when said lever 116 is aligned with lever 115, thereby providing means for preventing pivotal movement of the plates 100. When it is desired to fold the foot rest to a position adjacent the under side of the main frame, the toggle is broken. Thereafter the frame may be folded back and the toggle members will jackknife on themselves and assume the dotted line position shown in Fig. 1.

A brake for the device may be provided, and as shown in Fig. 3, comprises a lever 120 pivoted at 121 to one of the members 28. A brake shoe 122 is pivoted to said member 28 by means of a link 123 urged in a clockwise direction, as shown in said Fig. 3, by a spring 124 which has one end reacting against said member 28, and the other end reacting against the link 123, the spring 124 having a portion thereof turned about a pivot member 125 on which said link is pivoted. Lever 120 is provided with an extension 126 which is pivotally connected at 127 to a link 128, said link being pivotally connected to the brake shoe at 129, and said pivot 129 also serves as a pivotal connection between the brake shoe and the lever 123. When the brake is in the operative or applied position, as shown in solid lines in Fig. 3, the axis of pivot 127 is disposed slightly to the right, as shown in said Fig. 3, of the plane of the axes of the pivots 121 and 129, thereby locking the brake in its operative position. Releasing of the brake is effected by clockwise movement of the lever 120 which results in moving the various parts to the dotted line positions shown in Fig. 3, and said parts are maintained in said position by the spring 124.

A bumper 130 may also be provided and is shown as a reinforced rubber strip of substantially C-shape, the ends of which are secured to the bolts 25 which pass through the members 14 and 16.

The device may be folded into a compact parcel of relatively small overall dimensions. In folding the device the foot rest is folded back to the position shown in dotted lines in Fig. 1, as hereinabove described, the handle is then telescoped and the latching means is released permitting the handle to be folded forwardly to a position overlying the main frame, as shown by dotted lines in Fig. 1. Thereafter the wheels are folded under, as indicated by the dotted lines in Fig. 2, the wheels of only one side being thus shown, although it is to be understood that the wheels of the opposite side may also be folded under in the same manner.

When the device is folded it is to be noted that the relative positions of the various pivotal axes of the handle and the arm rest frame are such that the handle cannot be raised without first raising the arm rest frame so that the device is latched in its folded position.

To unfold the device the wheels are swung to their normal operable position and the arm rest frame is slightly lifted so that the handle may be swung back to its normal upright position and the handle reach portions 28 are then latched together. Should it be desired to permit the child to propel the device with its feet, the footrest is left in the folded position. However, if it is desired to allow the child to use the foot rest, it is swung to the full line position shown in Fig. 1.

I claim as my invention:

1. In a collapsible vehicle, the combination of: a main frame; longitudinally extending side members having laterally turned end portions, said side members being pivoted to said frame and adapted to be folded thereunder; wheels attached to the laterally turned ends of the side members; a substantially U-shaped handle having the arms thereof pivoted to the main frame; extensions on said handle arms positioned adjacent respective laterally turned end portions at the end of the vehicle having the handle; and means for releasably latching the extensions and adjacent laterally turned end portions of the side members rigidly together when said end portions are in a depending position.

2. In a collapsible vehicle, the combination of: a main frame comprising a pair of substantially U-shaped members having the backs thereof secured together and the arms extending laterally in substantially the same plane, said secured backs extending longitudinally of the main frame and being centrally located with respect to the ends of the laterally extending arms; longitudinally extending side members having laterally turned end portions, said side portions being pivoted to the arms of the respective sides of the frame; a wheel attached to each laterally turned end portion of the side members; a handle substantially in the shape of an inverted U and having the arms thereof pivoted to the adjacent arms of the main frame members, parts of said arms being disposed adjacent respective laterally turned end portions of the side members; and means for releasably latching said parts of the handle arms to the adjacent laterally turned end portions of said side members.

3. The invention defined by claim 2, including a seat adjacent the arms of the main frame members and having spring connections therewith; and a forward extension for said seat having a spring connection with the united back portions of said frame.

4. In a collapsible vehicle, the combination of: a frame having two pair of substantially U-shaped members, a pair of said members being arranged horizontally with the closed portions secured together back to back and the outer ends of said members extending outwardly, the other pair of U-shaped members being disposed adjacent the respective sides of the united members and forming reaches for the wheels; means pivotally supporting the second pair of members to the adjacent outer ends of the first pair of members, the second pair of members being adapted to be pivotally folded and unfolded with respect to the horizontal plane of the first pair of members; a fifth substantially U-shaped member forming a handle pivoted on the first mentioned pair of members, said handle being foldable and unfoldable with respect to the first mentioned pair of members; and latching means for rigidly securing the entire assembly in an unfolded position.

5. The invention defined by claim 4, including a back supported by the handle and foldable therewith.

6. The invention defined by claim 4, including an auxiliary frame providing arm rests and a tray support, said auxiliary frame being pivoted to the handle and to the first two members and held rigid by the latching of the handle to the reaches.

7. The invention defined by claim 4, including a foot rest pivotally supported by the backs of the first mentioned pair of U-shaped members and adapted to be moved from a depending usable position to a position adjacent the underside of said members.

OSCAR T. TOPPER.

REFERENCES CITED

The following references are of record in the file of this patent:

UNITED STATES PATENTS

| Number | Name | Date |
|---|---|---|
| 904,542 | Ledig | Nov. 24, 1908 |
| 1,005,348 | Spofford | Oct. 10, 1911 |
| 1,061,912 | Hilfrank | May 13, 1913 |
| 1,091,290 | Carr | Mar. 24, 1914 |
| 1,483,598 | Runne | Feb. 12, 1924 |
| 1,583,115 | Blackmore | May 4, 1926 |

FOREIGN PATENTS

| Number | Country | Date |
|---|---|---|
| 209,888 | Great Britain | Jan. 24, 1924 |